United States Patent
Harada

(10) Patent No.: US 9,756,791 B2
(45) Date of Patent: Sep. 12, 2017

(54) METHOD OF CULTIVATING CROPS BY GRAFTING USING SEEDS

(71) Applicant: HIROSAKI UNIVERSITY, Hirosaki-shi (JP)

(72) Inventor: Takeo Harada, Hirosaki (JP)

(73) Assignee: HIROSAKI UNIVERSITY, Hirosaki (JP)

( * ) Notice: Subject to any disclaimer, the term of this patent is extended or adjusted under 35 U.S.C. 154(b) by 120 days.

(21) Appl. No.: 14/440,447

(22) PCT Filed: Nov. 7, 2013

(86) PCT No.: PCT/JP2013/080086
§ 371 (c)(1),
(2) Date: May 4, 2015

(87) PCT Pub. No.: WO2014/073595
PCT Pub. Date: May 15, 2014

(65) Prior Publication Data
US 2015/0272013 A1    Oct. 1, 2015

(30) Foreign Application Priority Data
Nov. 7, 2012  (JP) .................................. 2012-245732

(51) Int. Cl.
*A01G 1/06*  (2006.01)
*A01G 1/00*  (2006.01)

(52) U.S. Cl.
CPC .............. *A01G 1/06* (2013.01); *A01G 1/001* (2013.01)

(58) Field of Classification Search
CPC . A01G 1/06; A01G 1/001; A01H 1/00; A01H 1/06

USPC .................................................. 47/6, DIG. 1
See application file for complete search history.

(56) References Cited

U.S. PATENT DOCUMENTS

| | | | |
|---|---|---|---|
| 5,236,469 A | 8/1993 | Carlson et al. | |
| 5,288,626 A * | 2/1994 | Levengood | C12N 15/8206 800/292 |
| 6,134,830 A * | 10/2000 | Welty | A01H 4/005 435/420 |
| 2002/0026659 A1* | 2/2002 | Blowers | A01C 1/00 800/298 |
| 2009/0055968 A1* | 2/2009 | Rudrabhatla | A01H 4/00 800/278 |

(Continued)

FOREIGN PATENT DOCUMENTS

CN    102870604 A    1/2013

OTHER PUBLICATIONS

Duman, Serdar, "Research on shortening the nursery period in grafted chestnut". 2006. Hort.Sci. (Prague), 33, 2006, (1): 16-22.*

(Continued)

*Primary Examiner* — Peter M Poon
*Assistant Examiner* — Magdalena Topolski
(74) *Attorney, Agent, or Firm* — Kratz, Quintos & Hanson, LLP

(57) ABSTRACT

A grafting technique effective for crops such as soybean and plants of the Poaceae family including rice, wheat, corn, etc. and a method of grafting crops of the present invention comprising the steps of replacing a radicle of a dry dormant seed with a radicle of another dormant seed capable of achieving grafting, and thereafter, germinating the seed.

5 Claims, 2 Drawing Sheets

(56) References Cited

U.S. PATENT DOCUMENTS

2011/0162106 A1* 6/2011 Sela .................. C12N 15/8203
800/288
2013/0298273 A1* 11/2013 Chang ..................... A01H 1/02
800/260

OTHER PUBLICATIONS

Fragoso, "A simple and efficient micrografting method for stably transformed Nicotiana attenuata plants to examine shoot-root signaling". Oct. 20, 2011. Plant Methods, 7, 34.*

Badalamenti, "Is in vitro micrografting a possible valid alternative to traditional micropropagation in Cactaceae Plelcyphora aselliformis as a case study". Feb. 27, 2016.*

Wang, "An integrated breeding technology for accelerating generation advancement and trait introgression in cotton". Feb. 16, 2011. Plant Breeding 130, 569-573.*

Extended European Search Report issued on Jun. 28, 2016 to the corresponding European patent application No. 13852543.1.

First Office Action issued on Sep. 5, 2016 to the corresponding Chinese Patent Application No. 201380057932.3.

Chinese document dated Dec. 31, 1959, p. 107-109.

Chinese document dated Dec. 31, 1960, p. 52-53.

Zhou, Xun."From Graft Hybridization to Distant Hybridization: the Practice of the Heredity Breeding Theory of Darwinism," Institute for the History of Natural Science, Vol, 7, No. 4, Dec. 2008, p. 86-91. English abstract.

M.-J. Cho, et al.; "Root Isoflavonoid Response to Grafting between Wild-Type and Nodulation-Mutant Soybean Plants;" Plant Physio.; vol. 96; 1991; pp. 1277-1282 (6 Sheets)/Cited in International Search Report/p. 3 of specification.

M. Inosaka; "Studies on the Grafting of Rice, Wheat and Barler Plant (Preliminary Report);" Japanese Journal of Crop Science; vol. 26; No. 2; 1957; p. 83 and cover sheet (2 Sheets)/Cited in International Search Report.

M. Njwa, et al.; "Studies on the Varietal Differences in Flowering Time of Soybean by Means of Grafting (with English Summary p. 348);" Japan. J. Breed.; vol. 25; No. 6; 1975; pp. 343-348 (6 Sheets)/Cited in International Search Report.

International Search Report for International Application No. PCT/JP2013/080086 dated Feb. 10, 2014.

* cited by examiner

[FIG. 1]
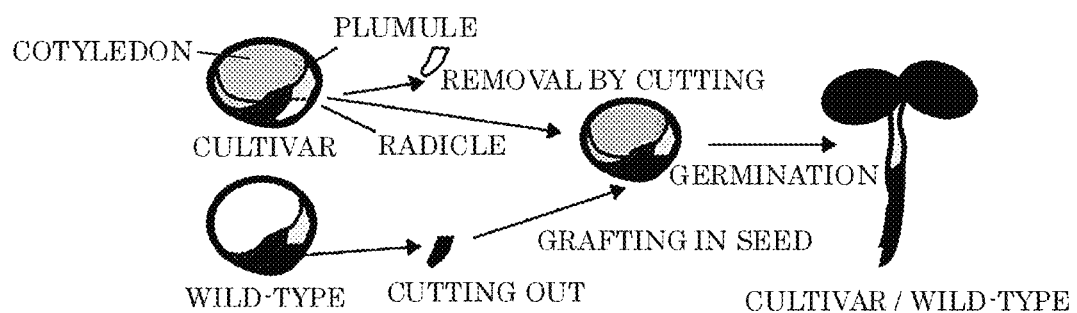
[Fig. 2]
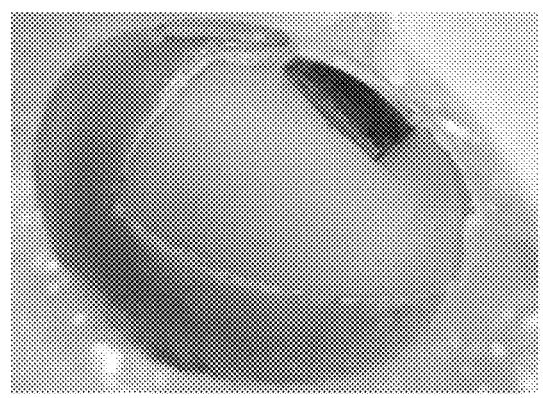

[Fig. 3]
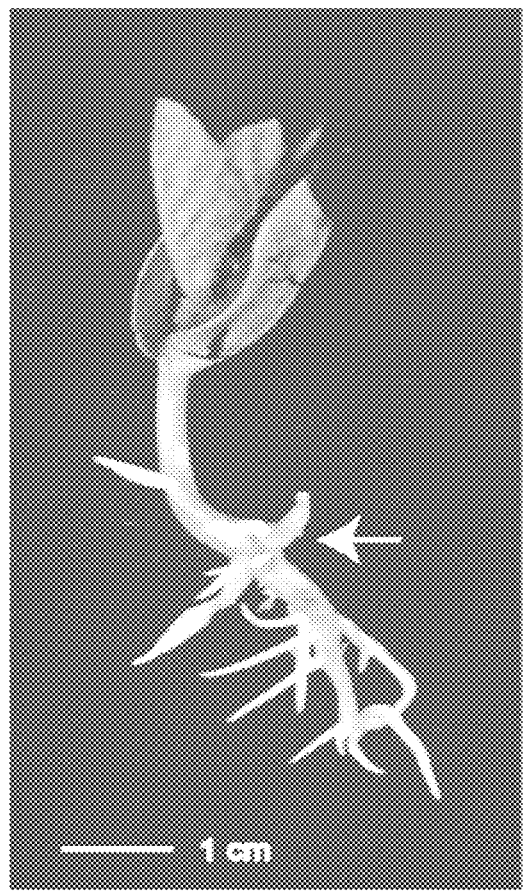

METHOD OF CULTIVATING CROPS BY GRAFTING USING SEEDS

TECHNICAL FIELD

The present invention relates to a method of cultivating a crop by grafting using seeds.

BACKGROUND ART

The surface area of roots is estimated to be 100 times or more that of above-ground parts, and a huge number of root hairs absorb water, inorganic nutrients, and the like. In recent years, the importance of the root system as "The Hidden Half" has been realized again, and the application thereof to a grafting technique has been expected to be developed. The grafting technique is a cultivation method in which, in general, a root part serving as a rootstock and an above-ground part serving as a scion are plant bodies of related species with different genomes, and the excellent abilities of both parts are made to work collaboratively. There is a record that grafting has been carried out for cultivating citrus fruits in China for about 4000 years. The original purpose of grafting is to maintain excellent individuals or impart an early flowering property, however, the existence of a rootstock species having a more excellent root system was found, and a grafting process preferentially using such rootstock species has been adopted. The merit of grafting is large in perennial woody plants, however, the reason why grafting is also adopted in annual crops such as tomato, eggplant, and cucumber is because there is an advantage of leading to the improvement of yield by using a rootstock having a higher ability.

However, the grafting technique has not been at all adopted in crops such as soybean and plants of the Poaceae family including rice, wheat, corn, etc. The reason for this is because grafting of young plants of plants of the Poaceae family is difficult, or soybean or the like is originally a plant, for which grafting can be carried out using a seedling thereof (see, for example, Nonpatent Document 1), however, such a plant is cultivated not by transplanting young plants in fields, but by directly sowing seeds in fields. Therefore, if a grafting technique effective for such crops is developed, a rootstock species having an excellent root system can be immediately practically used, so that a significant improvement of the productivity can be realized, however, such a proposal has not yet been presented.

PRIOR ART DOCUMENTS

Nonpatent Documents

Nonpatent Document 1: Cho MJ and Harper JE (1991) Plant Physiology 96: 1277-1282

SUMMARY OF THE INVENTION

Problems that the Invention is to Solve

In view of this, an object of the present invention is to provide a grafting technique effective also for crops such as soybean and plants of the Poaceae family including rice, wheat, corn, etc.

Means for Solving the Problems

In general, in the case of, for example, woody plants, grafting is carried out between young plants still in a dormant state in early spring. That is, graft surfaces are fixed in close contact with each other at a stage where the cell activities are very low, and then completely adhered to each other when the cells are reactivated as the cells emerge from a dormant state. Accordingly, the present inventor conceived an idea that grafting is carried out at a seed stage and conducted intensive studies, and as a result, he found a grafting technique in which a radicle of a dry seed in a dormant state is totally or partially replaced with a radicle of another seed, and thereafter, the seed is germinated.

A method of cultivating a crop of the present invention achieved based on the above-described finding is characterized by comprising, as described in claim 1, replacing a radicle of a dry seed with a radicle of another seed capable of achieving grafting, and thereafter, germinating the seed.

Further, the cultivation method described in claim 2 is characterized in that in place of a radicle cut out by cutting the radicle of the dry seed, a radicle cut out by cutting the radicle of another seed capable of achieving grafting is substituted in the cultivation method described in claim 1.

Further, the cultivation method described in claim 3 is characterized in that the crop is soybean in the cultivation method described in claim 1.

Further, a seed of a crop of the present invention is characterized in that, as described in claim 4, a radicle of a dry seed is replaced with a radicle of another seed capable of achieving grafting.

Further, a method of producing a seed of a crop of the present invention is characterized by comprising, as described in claim 5, replacing a radicle of a dry seed with a radicle of another seed capable of achieving grafting.

Effect of the Invention

According to the present invention, a grafting technique effective also for crops such as soybean and plants of the Poaceae family including rice, wheat, corn, etc. can be provided.

BRIEF DESCRIPTION OF THE DRAWINGS

FIG. 1 It is a scheme of a method of cultivating a crop by grafting in a seed of the present invention.

FIG. 2 It is a photograph of a seed of soybean in which grafting in a seed has been carried out in Example 1.

FIG. 3 It is a photograph of a seedling after 14 days from germination.

MODE FOR CARRYING OUT THE INVENTION

The method of cultivating a crop of the present invention is characterized by comprising replacing a radicle of a dry seed with a radicle of another seed capable of achieving grafting, and thereafter, germinating the seed. By totally or partially replacing a radicle of a dry seed in a dormant state with a radicle of another seed, crops such as soybean and plants of the Poaceae family including rice, wheat, corn, etc., in which a grafting technique has not been adopted at present, can also be cultivated through grafting by carrying out grafting at a seed stage, followed by germination. Further, the method of cultivating a crop of the present invention is configured to carry out grafting at a seed stage, and therefore, time and labor required for the procedure until grafting is carried out can be reduced as compared with the case where grafting is carried out between young plants. The seed after the radicle was taken out for replacing the radicle of the dry seed may be used for, for example, feed or processing.

The crop to which the present invention can be applied is not particularly limited as long as it is a spermatophyte having a radicle in a seed, and examples thereof include cereals, vegetables, flowering plants, and fruit trees, and the crop may be a dicotyledon or a monocotyledon, and also may be an angiosperm or a gymnosperm. However, the present invention can be preferably applied to soybean in addition to crops belonging to plants of the Poaceae family including rice, wheat, and corn, etc., for which grafting between young plants is difficult. Incidentally, the present invention can also be applied to crops belonging to plants of the Cucurbitaceae family including cucumber, melon, and watermelon, etc., for which grafting between young plants can be carried out.

The seed to serve as a supply source of the radicle to be used for replacing the radicle of the dry seed is not particularly limited as long as it is a seed of a crop capable of achieving grafting such as a crop of the same species or a crop belonging to the same family as that of the crop of the dry seed. For example, in the case where the dry seed is a seed of a cultivar, if there exists a seed of a wild-type plant of the same species having an excellent root system, the present invention is applied, and by replacing the radicle of the dry seed of the cultivar with the radicle taken out from the seed of the wild-type plant, based on the excellent root system of the wild-type plant, properties such as soil-borne disease resistance, nutrient absorbability, and drought tolerance can be imparted to the cultivar (FIG. 1).

The replacement of the radicle of the dry seed in a dormant state can be carried out basically as follows. A seed coat in a radicle portion is peeled off, and the radicle is cut out by cutting the radicle with a cutting tool such as a cutting knife or a surgical knife. Then, in place of the cut out radicle, the radicle cut out by cutting the radicle of another seed in the same manner is substituted (in the case where the seed is small, it is preferred to carry out this procedure under, for example, a microscope). This procedure may be carried out by a man or a robot. The radicle of the dry seed may be replaced totally or partially, and the radicle of the dry seed may be cut at a place, for example, from ½ of the total length of the radicle to the side of the hypocotyl. Since the dry seed is in a dormant state, even if the radicle is cut, the damage to the seed is little if any. The seed in which grafting in a seed is carried out in this manner can be stored for a long period of time in the same manner as a normal seed, and by sowing the seed and allowing the seed to absorb water to reactivate the cells, the substituted radicle is completely adhered to the cut surface of the radicle, and the seed is germinated. The germinated seed can be cultivated in the same manner as a grafted young plant obtained by grafting between young plants.

EXAMPLES

Hereinafter, the present invention will be described in detail with reference to Examples, however, the present invention is not construed as being limited to the following description.

Example 1

Cultivation of Soybean by Grafting in Seed

First, a seed coat of a dry seed of a cultivar was peeled off, and a radicle was cut out by cutting around the boundary between the radicle and the hypocotyl with a cutting knife for use in research. Further, in the same manner, a seed coat of a dry seed of a different cultivar was peeled off, and a radicle was cut out by cutting around the boundary between the radicle and the hypocotyl with a cutting knife for use in research. Subsequently, the radicle cut out from the former dry seed was replaced with the radicle cut out from the latter dry seed. In the replacement of the radicle, by using an extremely small amount of a commercially available instant adhesive, the substituted radicle was fixed to the joining surface. The seed in which grafting in a seed was carried out in this manner is shown in FIG. 2 (a colored portion in the upper right-hand is the substituted radicle). When this seed in which grafting in a seed was carried out was sown in horticultural vermiculite and cultivated, the seed was germinated, and a seedling was obtained in the same manner as in the case where a normal seed was sown and cultivated. The seedling after 14 days from the germination is shown in FIG. 3 (a portion indicated by the arrow is the place where grafting was carried out). Incidentally, the storage stability and germination rate of this seed in which grafting in a seed was carried out were not much different from those of a normal seed.

Example 2

Cultivation of Melon by Grafting in Seed

Grafting in a seed of melon was carried out in the same manner as in Example 1, whereby a seedling was obtained from the seed in which grafting in a seed was carried out.

Example 3

Cultivation of Watermelon by Grafting in Seed

Grafting in a seed of watermelon was carried out in the same manner as in Example 1, whereby a seedling was obtained from the seed in which grafting in a seed was carried out.

INDUSTRIAL APPLICABILITY

The present invention has an industrial applicability in that a grafting technique effective also for crops such as soybean and plants of the Poaceae family including rice, wheat, corn, etc. can be provided.

The invention claimed is:

1. A method of cultivating a crop, comprising the steps of: replacing a radicle of a dry dormant seed with a radicle of another dormant seed capable of achieving grafting, and thereafter, germinating the seed.

2. The cultivation method according to claim 1, wherein the radicle of the dry dormant seed is cut out and substituted with the radicle of another dormant seed capable of achieving grafting.

3. The cultivation method according to claim 1, wherein the dry dormant seed is for a soybean crop.

4. A seed of a crop, wherein a radicle of a dry dormant seed is replaced with a radicle of another dormant seed capable of achieving grafting.

5. A method of producing a seed of a crop, comprising the steps of:
replacing a radicle of a dry dormant seed with a radicle of another dormant seed capable of achieving grafting.

* * * * *